United States Patent
Sato

(10) Patent No.: US 6,891,786 B2
(45) Date of Patent: May 10, 2005

(54) OPTICAL DISK DRIVE, ITS OPTICAL RECORDING CONTROL METHOD AND DATA PROCESSING APPARATUS

(75) Inventor: Shinichi Sato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 626 days.

(21) Appl. No.: 09/994,900

(22) Filed: Nov. 28, 2001

(65) Prior Publication Data

US 2002/0064110 A1 May 30, 2002

(51) Int. Cl.[7] .............................. G11B 7/00; G11B 5/09
(52) U.S. Cl. ................................ 369/47.53; 369/47.38; 369/53.26
(58) Field of Search ................................ 369/47.5, 47.51, 369/47.52, 47.53, 53.26, 53.27, 53.3, 116, 47.38, 47.4, 47.43

(56) References Cited

U.S. PATENT DOCUMENTS

| | | | | |
|---|---|---|---|---|
| 5,592,463 A | * | 1/1997 | Muramatsu et al. | 369/47.53 |
| 5,617,401 A | * | 4/1997 | Hurst, Jr. | 369/47.52 |
| 5,737,289 A | * | 4/1998 | Udagawa | 369/47.5 |
| 6,108,289 A | | 8/2000 | Hashimoto | |
| 6,172,955 B1 | | 1/2001 | Hashimoto | |
| 6,333,904 B1 | | 12/2001 | Hashimoto | |
| 6,418,102 B1 | * | 7/2002 | Suga | 369/47.53 |
| 6,442,119 B1 | * | 8/2002 | Sunagawa | 369/47.53 |
| 6,552,980 B2 | * | 4/2003 | Yamazaki | 369/47.5 |
| 6,697,310 B1 | * | 2/2004 | Kuriuzawa et al. | 369/116 |
| 6,704,269 B1 | * | 3/2004 | Ogawa | 369/116 |

FOREIGN PATENT DOCUMENTS

| | | |
|---|---|---|
| JP | 7-21585 | 1/1995 |
| JP | 9-231580 | 9/1997 |
| JP | 9-270129 | 10/1997 |
| JP | 9-305973 | 11/1997 |
| JP | 10-79124 | 3/1998 |
| JP | 11-66726 | 3/1999 |
| JP | 11-296858 | 10/1999 |
| JP | 2000-11384 | 1/2000 |
| JP | 2000-48484 | 2/2000 |

* cited by examiner

Primary Examiner—Thang V. Tran
(74) Attorney, Agent, or Firm—Dickstein Shapiro Morin & Oshinsky LLP

(57) ABSTRACT

In an optical disk drive, an OPC is performed prior to a start of recording of an optical disk by accessing a power calibration area of the disk with a light beam emitted by a light source while the disk is rotated at a constant linear velocity. An optimum recording power for the light source during the recording is determined based on results of the OPC. A highest linear velocity of linear velocities is changed to a next highest linear velocity for a controlled velocity of a disk rotation device during a subsequent OPC. It is detected whether the OPC and the determination are normally performed after one of the linear velocities is set. The controlled velocity during the recording is set to an angular velocity corresponding to the one of the linear velocities at which the OPC and the determination are normally performed.

23 Claims, 11 Drawing Sheets

OPTICAL DISK DRIVE, ITS OPTICAL RECORDING CONTROL METHOD AND DATA PROCESSING APPARATUS

BACKGROUND OF THE INVENTION

1. Field of the Invention

The present invention relates to an optical disk drive which accesses an optical disk, such as CD-R (compact disk-recordable) or CD-RW (compact disk-rewritable), an optical recording control method which controls the optical disk drive, and a data processing apparatus in which the optical disk drive is provided.

2. Description of the Related Art

Generally, the information on optical disks, such as CD (compact disk), is recorded along tracks, which may be concentric rings of a certain width provided for the innermost track to the outermost track. Typically, a track is a narrow annulus at some distance from the disk center. The track pitch is the center-to-center distance between neighboring tracks. The information is recorded on the optical disks, including CD-R (compact disk-recordable) and CD-RW (compact disk-rewritable), at a constant linear recording density.

There are two major methods that carry out recording/reproducing of an optical disk, such as CD-R or CD-RW: one being called CLV (Constant Linear Velocity) method and one being called CAV (Constant Angular Velocity) method. Moreover, ZCLV (Zone CLV) method is known as a disk recording/reproducing method improving the CLV method. For example, see Japanese Laid-Open Patent Application Nos. 11-296858, 2000-11384, 2000-48484, 7-21585, 9-231580, 9-270129, 10-79124 and 11-66726.

In the case of the CLV method, the disk is rotated at a constant linear velocity, and the amount of information recorded on the disk is maximized whereas the data management and the disk rotation control in a complicated manner are performed. In the case of the CAV method, the disk is rotated at a constant angular velocity, and the data management and the disk rotation control may be easily performed whereas the amount of information recorded on the disk is decreased relatively from the maximum level of the CLV method.

In the case of the ZCLV method, the optical disk is divided into a number of zones. For each of the zones of the disk, the data management and the disk rotation control are performed with the constant linear velocity being kept, similar to the CLV method. The larger the disk rotation speed becomes, the outer the location of one of the zones on the disk is.

Recently, the CLV method is frequently used as the method for recording/reproducing of optical disks such as CD-R and CD-RW. Several optical disk drives that are based on the CLV method with the recording linear velocity being increased to higher values are commercially available. Further, optical disk drives that are based on the CAV method with the ease of the data management and the disk rotation control utilized, or based on the ZCLV method, will be commercialized. When the CLV-based medium, such as CD-R or CD-RW, is rotated at a constant angular velocity based on the CAV method, the linear velocity of a track on the disk varies to a larger value as the radius of the track around the disk center increases.

Although the development of optical disk drives with high recording linear velocity is put forward, there is the possibility that poor-quality optical media, which may be also commercially available, be used with the optical disk drives.

Normally, in a conventional optical disk drive, prior to the start of recording, an optical power calibration (OPC) is performed for a power calibration area (PCA) at the innermost location of the disk, in order to determine the optimum recording power. If a poor-quality optical disk is placed on the optical disk drive, the OPC is performed on the optical disk drive for the PCA of the poor-quality optical disk. When the OPC is performed with the poor-quality optical disk at a high recording speed that is 16 times higher than the double speed (which ranges from 1.2 m/s to 1.4 m/s), the servo control of the PCA of the disk does not follow in accordance with the recording track and an OPC error is likely to occur. As described earlier, in an optical disk drive based on the CAV method, the linear velocity of the track on the disk varies to a larger value as the radius of the track increases. In such a case, the OPC error is more likely to occur. If an OPC error occurs, it is difficult for the conventional optical disk drive to determine the optimum recording power prior to the start of recording. Hence, the conventional optical disk drive cannot start performing the recording of the optical disk because of the occurrence of an OPC error.

For example, Japanese Laid-Open Patent Application No. 9-305973 discloses an optical disk drive in which the optimum recording power is determined by performing an optical power calibration (OPC) at the outer peripheral portion of a user area of the disk. However, the conventional optical disk drive of the above document does not take into consideration countermeasures against an OPC error when the OPC is performed with a poor-quality optical disk at a high recording speed.

The optimum recording power for the laser diode of the optical pickup increases in proportion to changes of the linear velocity of the disk when performing the CAV method or the ZCLV method. If the recording power is kept constant, the recording of information in the disk at the outermost track using the optimum recording power is impossible. To avoid this, the optimum recording power, which is determined through the OPC, is adjusted in accordance with the linear velocity of the disk at the track of concern to be recorded. However, when using the laser diode of the optical pickup with its maximum output power being relatively low, or when using the poor-quality optical disk with a relatively low recording sensitivity, the optimum recording power that is determined through the OPC may exceed the maximum output power of the laser diode. In such a case, the conventional optical disk drive cannot continue performing the recording operation of the optical disk at the high recording speed.

SUMMARY OF THE INVENTION

An object of the present invention is to provide an improved optical disk drive in which the above-described problems are eliminated.

Another object of the present invention is to provide an optical disk drive which can appropriately determine the optimum recording power through the OPC prior to the recording of the optical disk based on the CAV method or the ZCLV method even when a poor-quality optical disk causing an OPC error is used, in order to make the starting of the recording operation at a high recording speed reliable.

Another object of the present invention is to provide an optical recording control method which controls an optical disk drive such that the optimum recording power can be appropriately determined through the OPC prior to the recording of the optical disk based on the CAV method or the ZCLV method even when a poor-quality optical disk causing an OPC error is used, in order to make the starting of the recording operation at a high recording speed reliable.

Another object of the present invention is to provide a data processing apparatus in which an optical disk drive is provided, the optical disk drive appropriately determining the optimum recording power through the OPC prior to the recording of the optical disk based on the CAV method or the ZCLV method even when a poor-quality optical disk causing an OPC error is used, in order to make the starting of the recording operation at a high recording speed reliable.

The above-mentioned objects of the present invention are achieved by an optical disk drive comprising: a light source emitting a light beam to a recordable optical disk by a controlled recording power; a disk rotation device rotating the disk at a controlled velocity; an OPC unit performing an optical power calibration OPC prior to a start of recording of the disk by accessing a power calibration area at a predetermined track of the disk with the light beam emitted by the light source while the disk is rotated at a constant linear velocity, the OPC being repeated with one of different recording powers being shifted to another and applied to the light source; an optimum recording power determining unit determining an optimum recording power for the light source during the recording of the disk based on results of the OPC performed by the OPC unit; an OPC velocity changing unit changing a highest linear velocity of a number of linear velocities, provided for the disk rotation device, to a next highest linear velocity for the controlled velocity of the disk rotation device during a subsequent OPC; a detecting unit detecting whether the OPC and the optimum recording power determination are normally performed after one of the linear velocities is set by the OPC velocity changing unit; and a rotation speed setting unit setting the controlled velocity of the disk rotation device during the recording to an angular velocity corresponding to said one of the linear velocities at which the OPC and the optimum recording power determination are detected as being normally performed.

The above-mentioned objects of the present invention are achieved by an optical recording control method which controls an optical disk drive, the optical disk drive including a light source emitting a light beam to a recordable optical disk by a controlled recording power, and a disk rotation device rotating the disk at a controlled velocity, the optical recording control method comprising the steps of: performing an optical power calibration OPC prior to a start of recording of the disk by accessing a power calibration area at a predetermined track of the disk with the light beam emitted by the light source while the disk is rotated at a constant linear velocity, the OPC being repeated with one of different recording powers being shifted to another and applied to the light source; determining an optimum recording power for the light source during the recording of the disk based on results of the OPC; changing a highest linear velocity of a number of linear velocities, provided for the disk rotation device, to a next highest linear velocity for the controlled velocity of the disk rotation device during a subsequent OPC; detecting whether the OPC and the optimum recording power determination are normally performed after one of the linear velocities is set in the OPC velocity changing step; and setting the controlled velocity of the disk rotation device during the recording to an angular velocity corresponding to said one of the linear velocities at which the OPC and the optimum recording power determination are detected as being normally performed.

The above-mentioned objects of the present invention are achieved by a data processing apparatus that in which an optical disk drive is provided, the optical disk drive comprising: a light source emitting a light beam to a recordable optical disk by a controlled recording power; a disk rotation device rotating the disk at a controlled velocity; an OPC unit performing an optical power calibration OPC prior to a start of recording of the disk by accessing a power calibration area at a predetermined track of the disk with the light beam emitted by the light source while the disk is rotated at a constant linear velocity, the OPC being repeated with one of different recording powers being shifted to another and applied to the light source; an optimum recording power determining unit determining an optimum recording power for the light source during the recording of the disk based on results of the OPC performed by the OPC unit; an OPC velocity changing unit changing a highest linear velocity of a number of linear velocities, provided for the disk rotation device, to a next highest linear velocity for the controlled velocity of the disk rotation device during a subsequent OPC; a detecting unit detecting whether the OPC and the optimum recording power determination are normally performed after one of the linear velocities is set by the OPC velocity changing unit; and a rotation speed setting unit setting the controlled velocity of the disk rotation device during the recording to an angular velocity corresponding to said one of the linear velocities at which the OPC and the optimum recording power determination are detected as being normally performed.

According to the optical disk drive of one preferred embodiment of the present invention, the OPC velocity changing unit changes a highest linear velocity of the linear velocities, provided for the disk rotation device, to a next highest linear velocity for the controlled velocity during a subsequent OPC. It is possible for the optical disk drive of the present invention to appropriately determine the optimum recording power through the OPC even when a poor-quality optical disk is used. The optical disk drive of the present invention is effective in making the starting of the recording operation at a high recording speed reliable.

BRIEF DESCRIPTION OF THE DRAWINGS

Other objects, features and advantages of the present invention will be apparent from the following detailed description when read in conjunction with the accompanying drawings.

DETAILED DESCRIPTION OF PREFERRED EMBODIMENTS

A description will now be given of preferred embodiments of the present invention with reference to the accompanying drawings.

Figure 1:
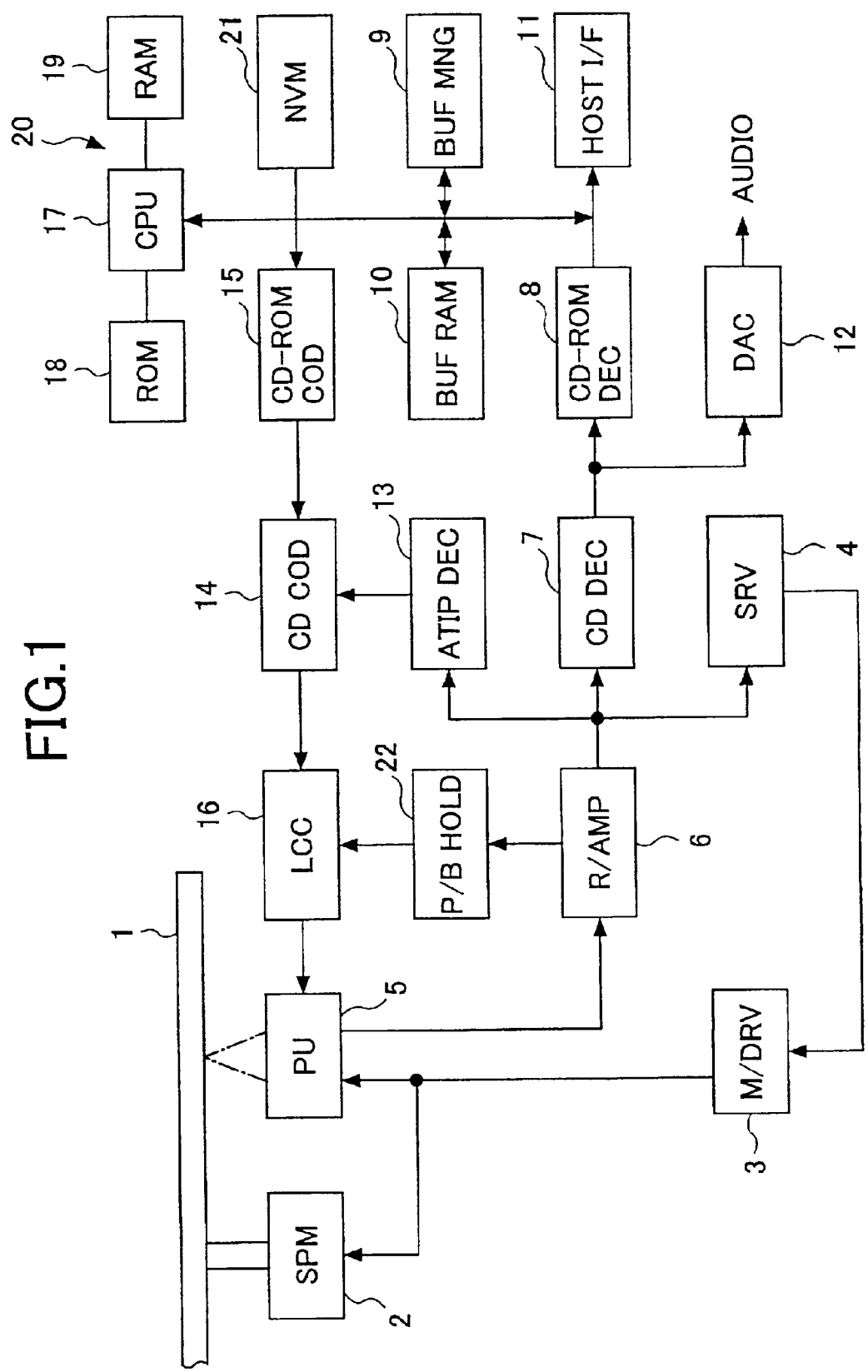
FIG. 1 is a block diagram of one preferred embodiment of the optical disk drive of the invention.

FIG. 1 shows one preferred embodiment of the optical disk drive of the present invention. The optical disk drive of the present embodiment is configured into an optical disk recording/reproducing device that accesses CD-R as the optical disk 1.

In the optical disk drive of the present embodiment, the optical disk 1 is rotated by a spindle motor (SPM) 2. The rotation of the spindle motor 2 is controlled by a motor driver (M/DRV) 3 and a servo unit (SRV) 4 so that the disk 1 is rotated by the spindle motor 2 at a constant linear velocity (CLV) or a constant angular velocity (CAV). An optical pickup (PU) 5 includes a laser diode as the light source, an optical system, a focusing actuator, a tracking actuator, a photodetector, and a position sensor, which are not specifically shown in FIG. 1. The laser diode of the pickup 5 emits a laser light beam to the recording surface of the optical disk 1.

The pickup 5 can be moved to the disk 1 in a disk radial direction by a seeking motor (not shown). The seeking motor, the focusing actuator and the tracking actuator, which are provided in the pickup 5, are controlled by the motor driver 3 and the servo unit 4 based on detection signals sent from the photodetector and the position sensor, so that a beam spot, formed by the focused light beam, is positioned to a desired track on the recording surface of the disk 1.

When reading information from the optical disk 1, a readout signal, produced from the disk 1 by the pickup 5, is amplified by a read amplifier (R/AMP) 6. After the amplified readout signal is digitized, the resulting digital signal is input to a CD decoder (CD DEC) 7. In the CD decoder 7, the de-interleaving and error correction process is performed for the input digital signal. The processed signal from the CD decoder 7 is input to a CD-ROM decoder (CD-ROM DEC) 8. In the CD-ROM decoder 8, the error correction process is performed to increase the reliability of the processed signal.

Moreover, the processed readout signal from the CD-ROM decoder 8 is temporarily stored into a buffer RAM (BUF RAM) 10 by a buffer manager (BUF MNG) 9. At the time the amount of the stored signal of the buffer RAM 10 becomes equal to the amount corresponding to one sector of the disk 1, the stored signal corresponding to the one-sector amount is transferred from the buffer RAM 10 to a host computer (not shown) via a host interface (HOST I/F) 11. The host interface 11 is provided based on the ATAPI (AT attachment packet interface) standard or the SCSI (small computer system interface) standard.

In a case in which the readout signal contains music data, the processed signal from the CD decoder 7 is input to a digital-to-analog converter (DAC) 12. In the converter 12, the input music data is converted into an analog audio signal, which is obtained at the output of the converter 12.

When writing the information to the optical disk 1, the host interface 11 receives the writing data from the host computer (not shown). The received data is temporarily stored into the buffer RAM 10 by the buffer manager 9. The recording of the disk 1 by the optical disk drive is started at the time the amount of the stored data of the buffer RAM 10 reaches a certain amount. Prior to the start of the recording, the pickup 5 is controlled such that the beam spot, formed by the light beam from the pickup 5, is positioned to a write start location on the disk 1. The write start location on the disk 1 is determined based on a wobble signal recorded onto the disk 1. The wobble signal on the disk 1 includes an absolute time information packet (called ATIP). An ATIP decoder (ATIP DEC) 13 generates the ATIP from the wobble signal detected by the pickup 5, and the ATIP from the ATIP decoder 13 is input to a CD encoder (CD COD) 14 as a sync signal on the basis of which the write start location for the pickup 5 is determined prior to the recording of the disk 1.

The sync signal that is supplied from the ATIP decoder 13 to the CD encoder 14 allows the synchronization of the emission of the laser diode of the pickup 5 with the supply of the writing information from the CD encoder 14 to a laser control circuit (LCC) 16. In a CD-ROM encoder (CD-ROM COD) 15 or the CD encoder 14, the interleaving process and the addition of error correction codes thereto are performed for the data from the buffer RAM 10. The processed signal from the CD encoder 14 or the CD-ROM encoder 15 is input to the laser control circuit 16. The laser control circuit 16 controls the laser diode of the pickup 5 so that the recording of the disk 1 is carried out by the laser light beam emitted by the laser diode in accordance with the writing data.

The optical disk drive of the above-described embodiment is provided with a microcomputer that controls the elements of the optical disk drive to achieve the respective functions of these elements. The microcomputer generally includes a CPU 17, a ROM 18 and a RAM 19. Moreover, the optical disk drive of the present embodiment includes a non-volatile memory (NVM) 21. The non-volatile memory 21 is provided to store the results of the previous OPC that is previously performed for the power calibration area of an optical disk. Further, the optical disk drive of the present embodiment includes a radio-frequency peak/bottom holding unit (P/B HOLD) 22, which will be described later.

Figure 2:
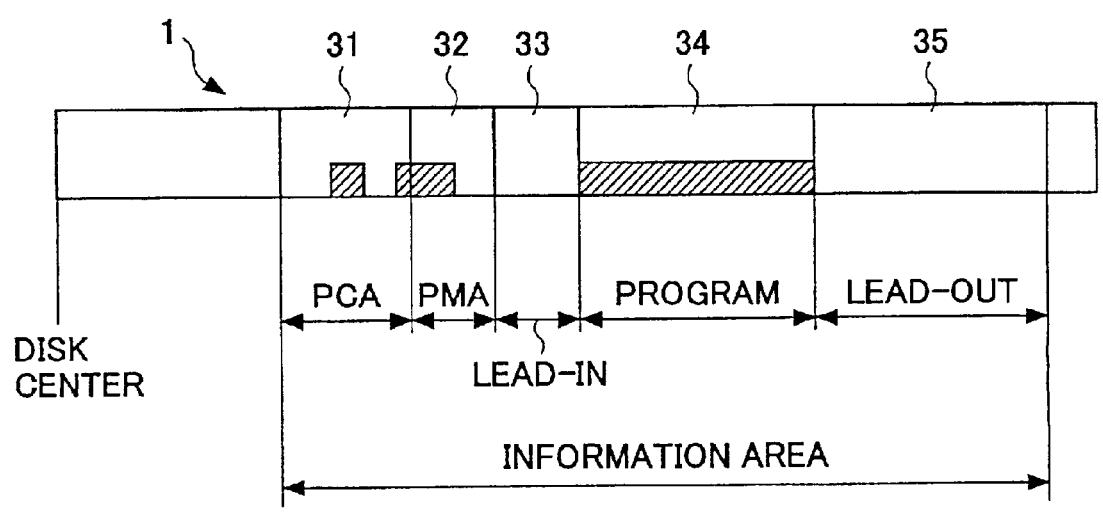
FIG. 2 is a diagram for explaining the structure of an information area of an optical disk.

FIG. 2 shows the structure of an information area of an optical disk 1. The optical disk 1 is, for example, a 120-mm CD-R. A partial cross-sectional view of the optical disk 1 taken along a radial direction of the disk is shown in FIG. 2. At the innermost portion of the information area of the disk 1, a PCA (power calibration area) 31 is provided. At the intermediate portions of the information area of the disk 1, a PMA (program memory area) 32, a lead-in area 33, and a program area 34 are provided in this order in the inner-to-outer direction. At the outermost portion of the information area of the disk 1, a lead-out area 35 is provided. The optical disk drive of the present invention performs the OPC by accessing the PCA 31 of the disk, in order to determine the optimum recording power for the laser diode of the optical pickup 5. For example, the PCA 31 is allocated to the tracks that are located about 44.7 mm apart from the center of the disk 1.

As described above, in the optical disk drive of the present embodiment, the writing data, which is received at the host interface 11, is temporarily stored into the buffer RAM 10, and then the recording of the disk 1 by the optical disk drive is started. However, prior to the start of the recording, the optical disk drive performs the OPC for the PCA 31 of the optical disk 1 if the results of the previous OPC are not stored in the non-volatile memory 21. Then, the CPU 17 determines the optimum recording power for the laser diode of the pickup 5 based on the results of the OPC. The OPC is repeated (for example, 15 times) with one of different recording powers being shifted to another for each block of the PCA 31 of the disk 1, and the recording power is applied to the laser diode of the pickup 5 so that the OPC pattern is written to the disk 1.

During the OPC, the readout signal is detected by the pickup 5 which receives the reflection beam from the disk 1. The read amplifier 6 amplifies the readout signal detected by the pickup 5, and the amplified signal from the read amplifier 6 is input to the hold unit 22. In the hold unit 22, the upper peak level "P" (or the peak level) and the lower peak level "B" (or the bottom level) of the amplified readout signal are detected. The upper peak level "P" and the lower peak level "B", sent from the hold unit 22, are converted into digital signals. The CPU 17 detects the β, value, indicating the RF signal symmetry of the readout signal, from the upper and lower peak levels "P" and "B" by using the equation: β=(P+B)/(P−B). The detection of the β value is performed for each of the blocks of the PCA 31 of the disk 1. The CPU 17 determines that the recording power, which is applied to the laser diode of the pickup 5 for the PCA block of the disk 1 where the β, value is nearest to a target value (for example, 0.04), is the optimum recording power. When performing the OPC, the disk 1 is rotated at a constant linear velocity by using the CLV method. In this manner, the CPU 17 determines the optimum recording power based on the results of the OPC, and issues a power setting command to set the optimum recording power in the laser control circuit 16 so that the recording of the disk 1 is started with the optimum recording power.

In the optical disk drive of the present embodiment, when the optical disk 1 is placed into the optical disk drive and a write command is issued by the host computer, the CPU 17 executes an optical recording control routine which controls the optical disk drive of the present embodiment to perform the recording of the disk 1, which will now be described later.

Figure 3:
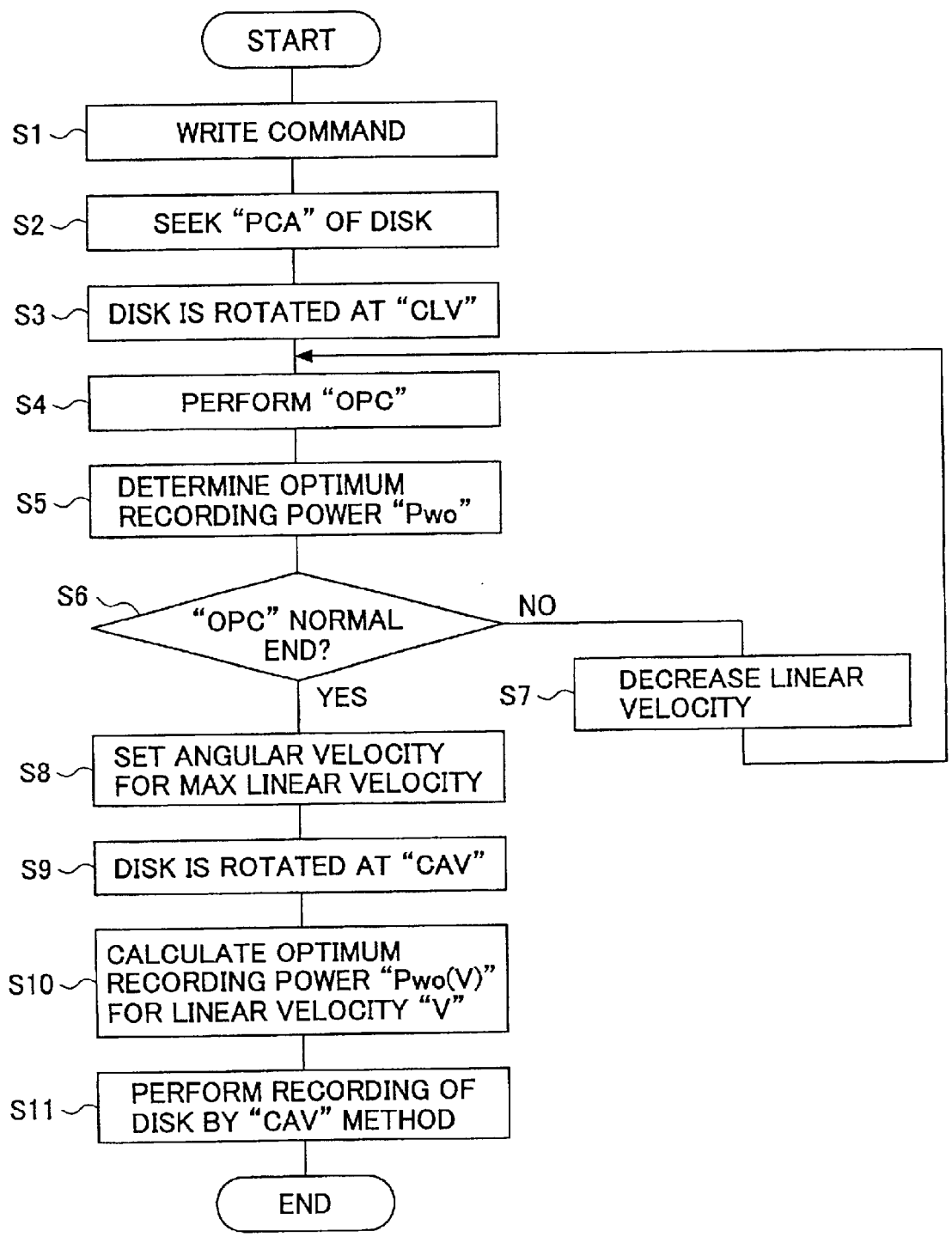
FIG. 3 is a flowchart for explaining one preferred embodiment of the optical recording control method of the invention.

FIG. 3 shows an optical recording control routine which is executed by the CPU 17 to control the optical disk drive of the present embodiment.

As shown in FIG. 3, at a start of the optical recording control routine, the CPU 17 receives the write command from the host computer (S1). In response to the write command, the CPU 17 causes the pickup 5 to seek the PCA 31 of the disk 1 at the innermost location of the information area of the disk 1 (S2). In the example of FIG. 2, the PCA 31 is allocated to the tracks that are located about 44.7 mm apart from the disk center.

After the step S2 is performed, the CPU 17 controls the spindle motor 2 via the motor driver 3 so that the disk 1 is rotated at a constant linear velocity (S3). Suppose that the linear velocities, which are provided for the spindle motor 2 of the optical disk drive, include 16-fold, 12-fold, 8-fold, 6-fold, and 2-fold double speeds. In the step S3, the CPU 17 selects the highest linear velocity (e.g., the 16-fold double speed) among these linear velocities and sets the rotation speed of the spindle motor 2 at the highest linear velocity during the OPC.

After the step S3 is performed, the CPU 17 performs the OPC by accessing the PCA 31 of the disk 1 while the disk 1 is rotated at the CLV (or the highest linear velocity) (S4). In the step S4, the OPC is repeated with one of different recording powers being shifted to another, and the recording power is applied to the laser diode of the pickup 5 such that the laser beam emitted to the PCA 31 of the optical disk 1 for each OPC has a different intensity.

After the step S4 is performed, the CPU 17 determines an optimum recording power "Pwo" for the laser diode of the optical pickup 5 based on the results of the OPC (S5). In the step S5, the OPC pattern written to the disk 1 is reproduced by the optical disk drive, and the characteristics of a readout signal obtained from the written pattern are detected. Then, in the above-described manner, the CPU 17 determines the optimum recording power "Pwo".

The CPU 17 determines whether the OPC operation in the step S4 and the determination of the optimum recording power Pwo in the step S5 are normally complete (S6). In some cases, the OPC operation is not normally performed due to the use of a poor-quality optical disk or the like, and an OPC error may occur.

When the result at the step S6 is negative (the OPC error), the CPU 17 decreases the rotation speed of the spindle motor 2 to a next highest linear velocity (S7). When the highest linear velocity (the 16-fold double speed) is used by the spindle motor 2 in the step S4, the CPU 17 in this step decreases the rotation speed of the spindle motor 2 to the next highest linear velocity (the 12-fold double speed). After the step S7 is performed, the control of the CPU 17 is transferred to the step S4, and the steps S4 to S6 are repeated. Hence, every time the result at the step S6 is negative, the rotation speed of the spindle motor 2 is decreased to the next highest linear velocity and the next OPC operation is performed again.

When the result at the step S6 is affirmative (the normal end), the CPU 17 sets an angular velocity of the spindle motor 2 corresponding to the maximum linear velocity at which the OPC operation is normally performed (S8). The angular velocity set in the step S8 is a basic angular velocity that is used to set a constant angular velocity when the recording of the disk 1 at the write start location (or a target track) is actually performed by using the CAV method. For example, suppose that an OPC error occurs at the 12-fold double speed of the spindle motor 2 and the OPC operation at the 8-fold double speed is normally performed. In such a case, the CPU 17 sets an angular velocity of the spindle motor 2 corresponding to the 8-fold double speed. The 8-fold double speed is the basic linear velocity measured at the innermost track of the disk 1. In the step S8, the optimum recording power "Pwo" for the maximum linear velocity at which the OPC operation is normally performed is fixed. For the sake of convenience, this optimum recording power is indicated as "Pwo_m".

After the step S8 is performed, the CPU 17 controls the spindle motor 2 so that the disk 1 is rotated at a constant angular velocity (S9). After the step S9 is performed, the CPU 17 calculates a second optimum recording power "Pwo (V)" for a linear velocity "V" corresponding to a target track of the disk 1 being recorded, based on the fixed optimum recording power (S10). The calculation of the second optimum recording power for the linear velocity is performed according to the following equation:

$$Pwo(V)=Pwo\_m*\text{sqrt}(V/V\_m) \qquad (1)$$

where "V" is the linear velocity at the target track of the disk 1 to be written by the pickup 5, and "V_m" is the maximum linear velocity at which the OPC operation is normally performed.

After the step S10 is performed, the CPU 17 performs the recording of the disk 1 by using the CAV method based on the second optimum recording power (S11).

In the optical recording control method of the above-described embodiment, the CPU 17 of the optical disk drive sets an angular velocity of the spindle motor 2 corresponding to the maximum linear velocity at which the OPC operation is normally performed. In the steps S4 through S7, every time the OPC operation is not normally performed, the rotation speed of the spindle motor 2 is decreased to the next highest linear velocity, and the next OPC operation is performed again. If the optical disk 1 should be a poor-quality optical disk, it is possible for the present embodiment to appropriately determine the optimum recording power through the OPC prior to the recording of the optical disk based on the CAV method, in order to make the starting of the CAV-based recording operation at a high recording speed reliable.

Figure 4:
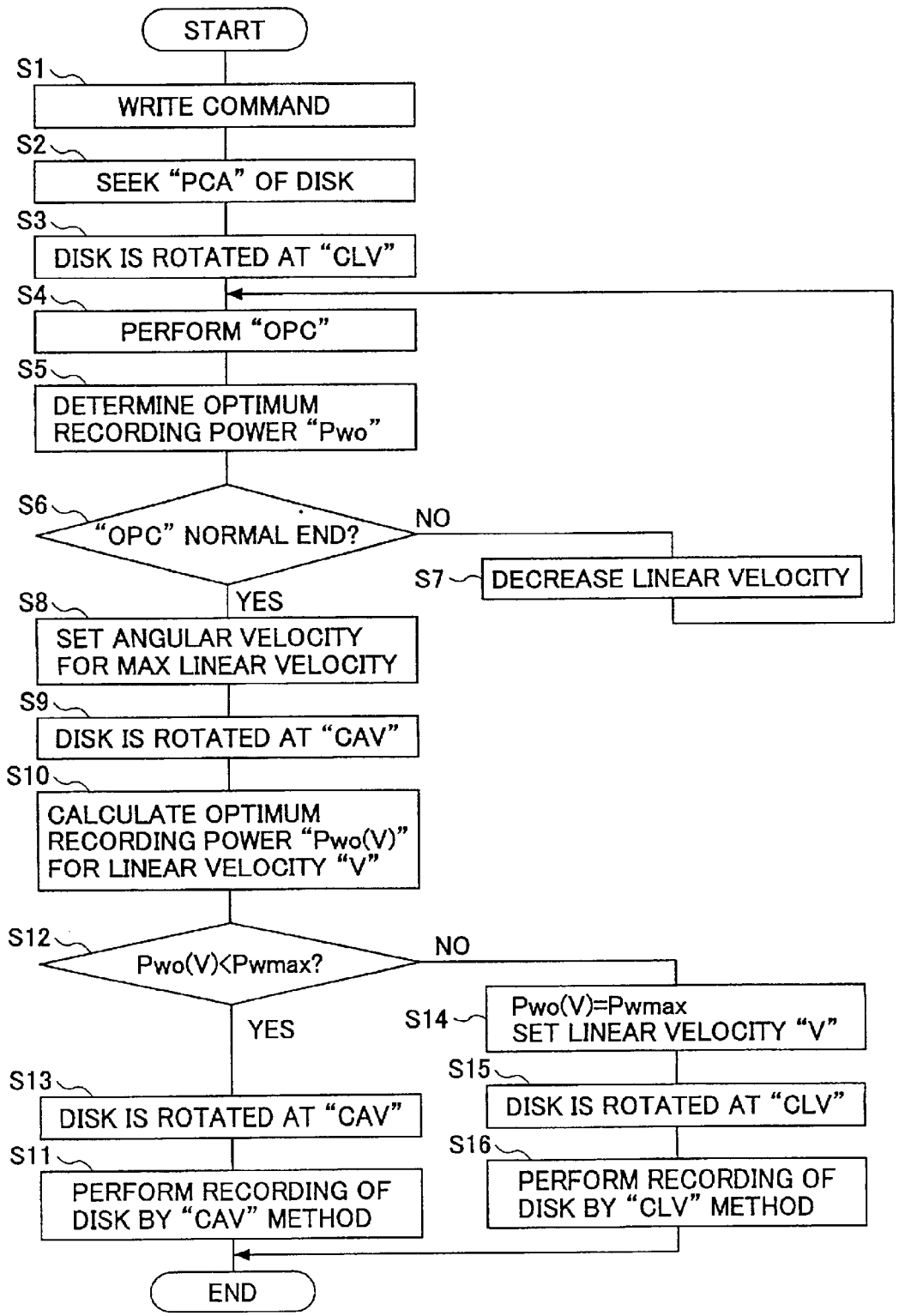
FIG. 4 is a flowchart for explaining another preferred embodiment of the optical recording control method of the invention.

Next, FIG. 4 shows another preferred embodiment of the optical recording control method of the present invention. In FIG. 4, the steps that are essentially the same as corresponding steps in FIG. 3 are designated by the same reference numerals, and a description thereof will be omitted.

In the previous embodiment shown in FIG. 3, the optimum recording power "Pwo (V)" increases in proportion to changes of the linear velocity of the disk 1 when the recording of the disk 1 is performed by using the CAV method. Hence, when using the laser diode of the optical pickup with its maximum output power being relatively low, or when using the poor-quality optical disk with a relatively low recording sensitivity, the optimum recording power "Pwo (V)" that is determined through the OPC may exceed the maximum output power "Pwmax" of the laser diode. In such a case, the recording of the disk 1 using the optimum recording power is impossible. The optical recording control method of the present embodiment is provided to eliminate the above problem.

As shown in FIG. 4, in the optical recording control method of the present embodiment, the CPU 17 performs the steps S1 through S10 that are essentially the same as the corresponding steps in FIG. 3. After the step S10 is performed, the CPU 17 determines whether the optimum recording power "Pwo (V)", obtained at the step S10, is smaller than the maximum output power "Pwmax" of the laser diode of the pickup 5 (S12).

When the result at the step S12 is affirmative (Pwo(V) <Pwmax), it is not necessary to change the CAV-based recording operation. The CPU 17 controls the spindle motor 2 so that the disk 1 is rotated at a constant angular velocity (S13). After the step S13 is performed, the CPU 17 performs the recording of the disk 1 by using the CAV method (S1).

On the other hand, when the result at the step S12 is negative (Pwo(V)≧Pwmax), the CAV-based recording operation must be changed. The CPU 17 sets the optimum recording power "Pwo (V)" as being equal to the maximum output power "Pwmax" of the laser diode (S14). After the step S14 is performed, the CPU 17 changes the CAV-based recording operation to the CLV-based recording operation. Namely, the CPU 17 controls the spindle motor 2 so that the disk 1 is rotated at a constant linear velocity (S15). The linear velocity used in the step S15 for the CLV method is the linear velocity at the target track to be written by the pickup 5. After the step S15 is performed, the CPU 17 performs the recording of the disk 1 by using the CLV method (S16).

Figure 5:
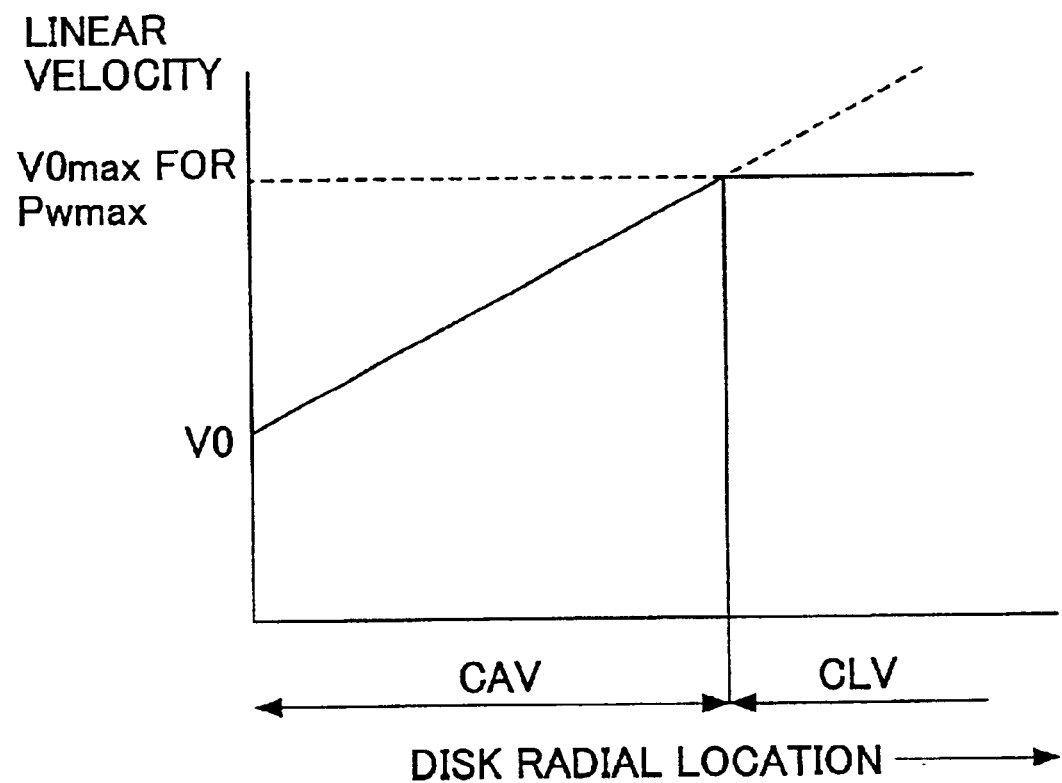
FIG. 5 is a diagram for explaining a switching operation to change the CAV method to the CLV method.

FIG. 5 shows a switching operation to change the CAV method to the CLV method, which is performed when the optimum recording power "Pwo (V)" exceeds the maximum output power "Pwmax" of the laser diode.

According to the optical recording control method of the above-described embodiment, when using the laser diode of the optical pickup with its maximum output power being relatively low, or when using the poor-quality optical disk with a relatively low recording sensitivity, the optimum recording power "Pwo (V)" that is determined as the result of the steps S12 and S14 does not exceed the maximum output power "Pwmax" of the laser diode. Therefore, it is possible for the present embodiment to eliminate the above problem.

Figure 6:
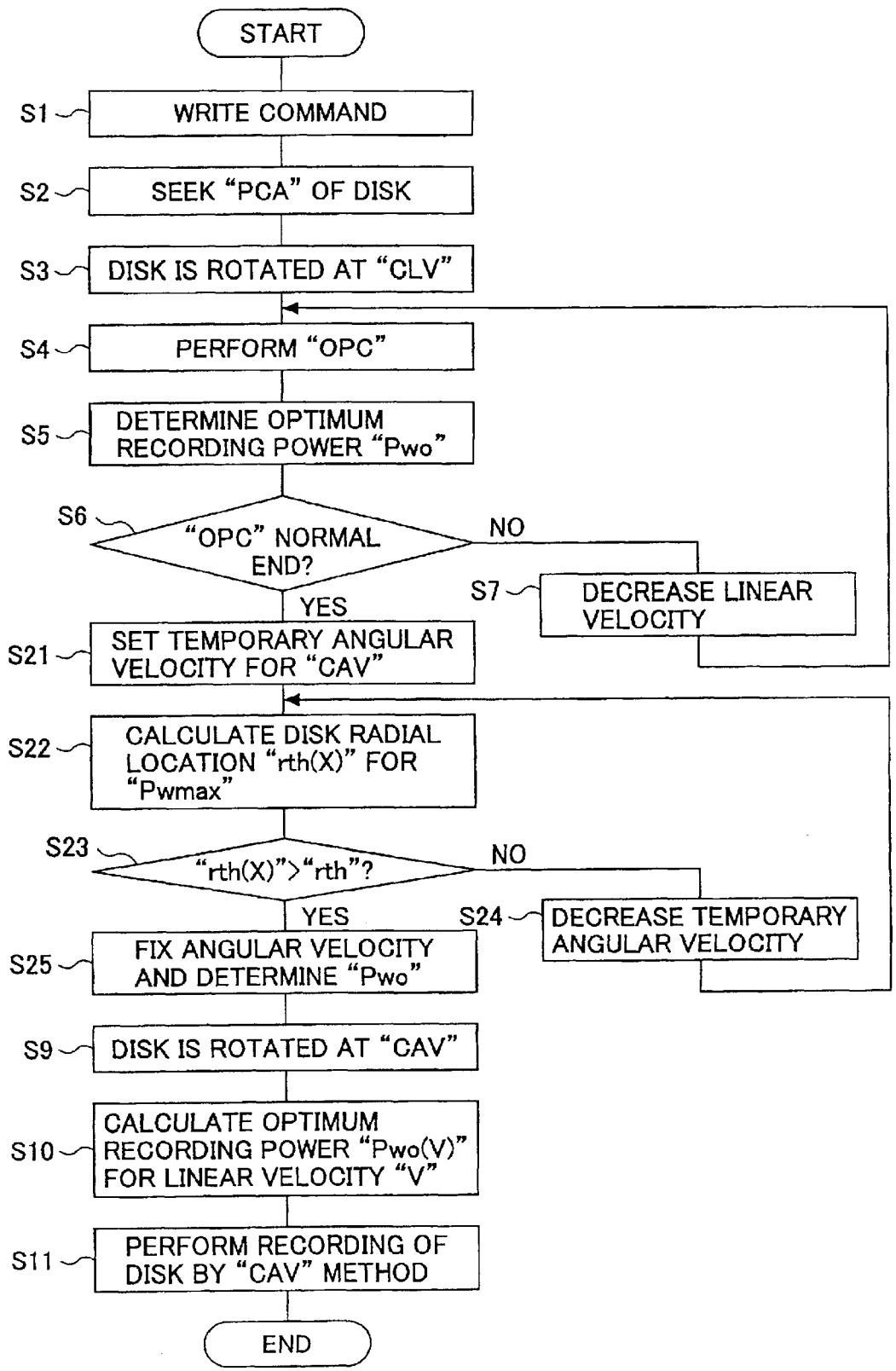
FIG. 6 is a flowchart for explaining another preferred embodiment of the optical recording control method of the invention.

Next, FIG. 6 shows another preferred embodiment of the optical recording control method of the invention. In FIG. 6, the steps that are essentially the same as corresponding steps in FIG. 3 are designated by the same reference numerals, and a description thereof will be omitted.

In the previous embodiment shown in FIG. 3, the angular velocity corresponding to the maximum linear velocity in which the OPC operation is normally performed is set in the step S8. However, there is a case in which the optimum recording power Pwo (V) based on this angular velocity shortly exceeds the maximum output power of the laser diode. The optical recording control method of the present embodiment is provided to eliminate the above problem.

As shown in FIG. 6, in the present embodiment, the CPU 17 performs the steps S1 through S7 that are essentially the same as the corresponding steps in FIG. 3. When the result at the step S6 is affirmative, the CPU 17 sets a temporary angular velocity for the CAV method that corresponds to the maximum linear velocity at which the OPC operation is normally performed (S21).

After the step S21 is performed, the CPU 17 calculates a disk radial location "rth (X)" at which the optimum recording power "Pwo (V)" reaches the maximum output power "Pwmax" of the laser diode (S22). In the step S22, suppose that the CAV-based recording of the disk 1 is performed by using the optimum recording power "Pwo" obtained at the step S5 and the temporary angular velocity obtained at the step S21.

The optimum recording power "Pw (V)" at a disk radial location "r" of the disk 1 is represented as a function of the linear velocity "V" by the following formulas.

$$Pw(V) = Pwo \times \text{sqrt}(V/Vo) \quad (2)$$

$$V/2\pi R32 \ 1/\omega \quad (3)$$

where "Vo" is the maximum linear velocity at which the OPC operation is normally performed, "Pwo" is the optimum recording power obtained by performing the OPC at "Vo", "V" is the linear velocity (the double speed: 1.2 m/s to 1.4 m/s), "R" is the disk radial location, and "ω" is the disk rotation speed.

Substituting the maximum output power "Pwmax" into "Pw (V)" of the above formula (2) gives the linear velocity "V" when the maximum output power of the laser diode is reached. The disk radial location "rth (X)" corresponding to the maximum output power "Pwmax" is obtained by using the above formula (3). determines whether the optimum recording power "Pwo (V)", obtained at the step S10, is smaller than the maximum output power "Pwmax" of the laser diode of the pickup 5 (S12).

Figure 7:
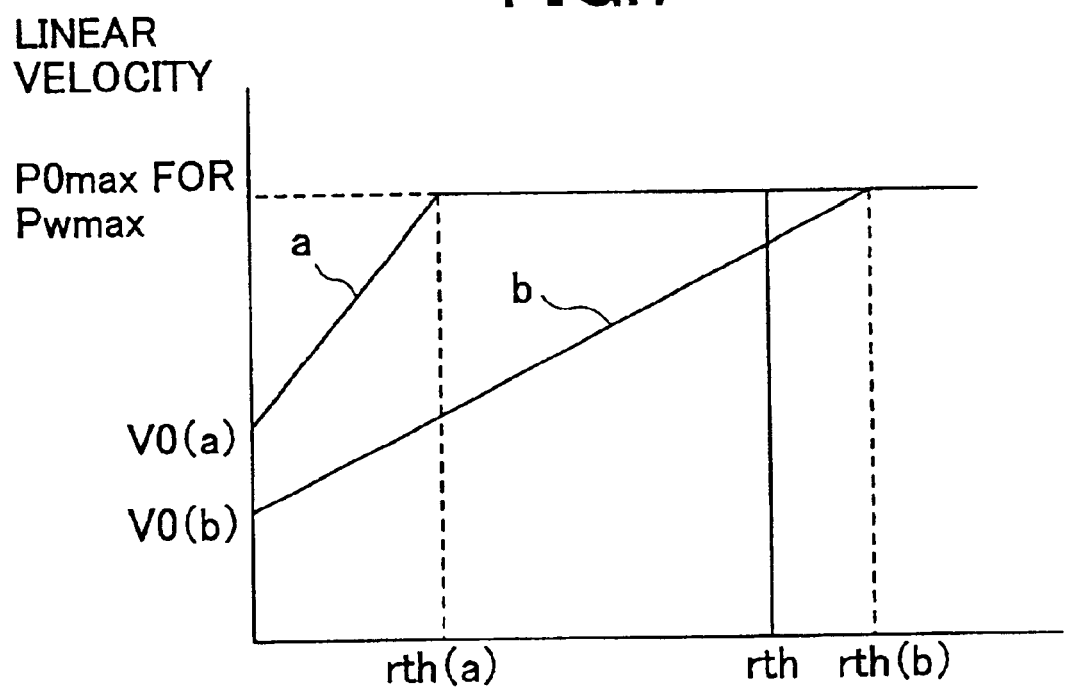
FIG. 7 is a diagram for explaining the characteristics of the maximum linear velocity when the disk radial location accessed by the pickup exceeds a threshold position.

FIG. 7 shows the characteristics of the maximum linear velocity when the disk radial location accessed by the pickup exceeds a predetermined threshold position "rth" where the maximum linear velocity reaches the maximum output power "Pwmax" of the laser diode.

After the step S22 is performed, the CPU 17 determines whether the disk radial location "rth (X)" is larger than the predetermined threshold position "rth" shown in FIG. 7 (S23).

When the result at the step S23 is affirmative (rth(X)>rth), the CPU 17 fixes the angular velocity and the optimum recording power "Pwo" similar to the step S8 of the previous embodiment of FIG. 3 (S25). After the step S25 is performed, the CPU 17 performs the steps S9 to S11 that are the same as corresponding steps of the previous embodiment of FIG. 3.

On the other hand, when the result at the step S23 is negative (rth(X)<rth), the CPU 17 decreases the temporary angular velocity of the spindle motor 2 to a next highest angular velocity thereof (S24). The above steps S22 and S23 are repeated until the result at the step S23 becomes affirmative.

According to the optical recording control method of the present embodiment, it is possible to prevent the optimum recording power Pwo (V) determined based on the angular velocity (V) from shortly exceeding the maximum output power of the laser diode. The optical recording control method of the present embodiment is effective in making the starting of the CAV-based recording operation at a high recording speed more reliable.

Figure 8:
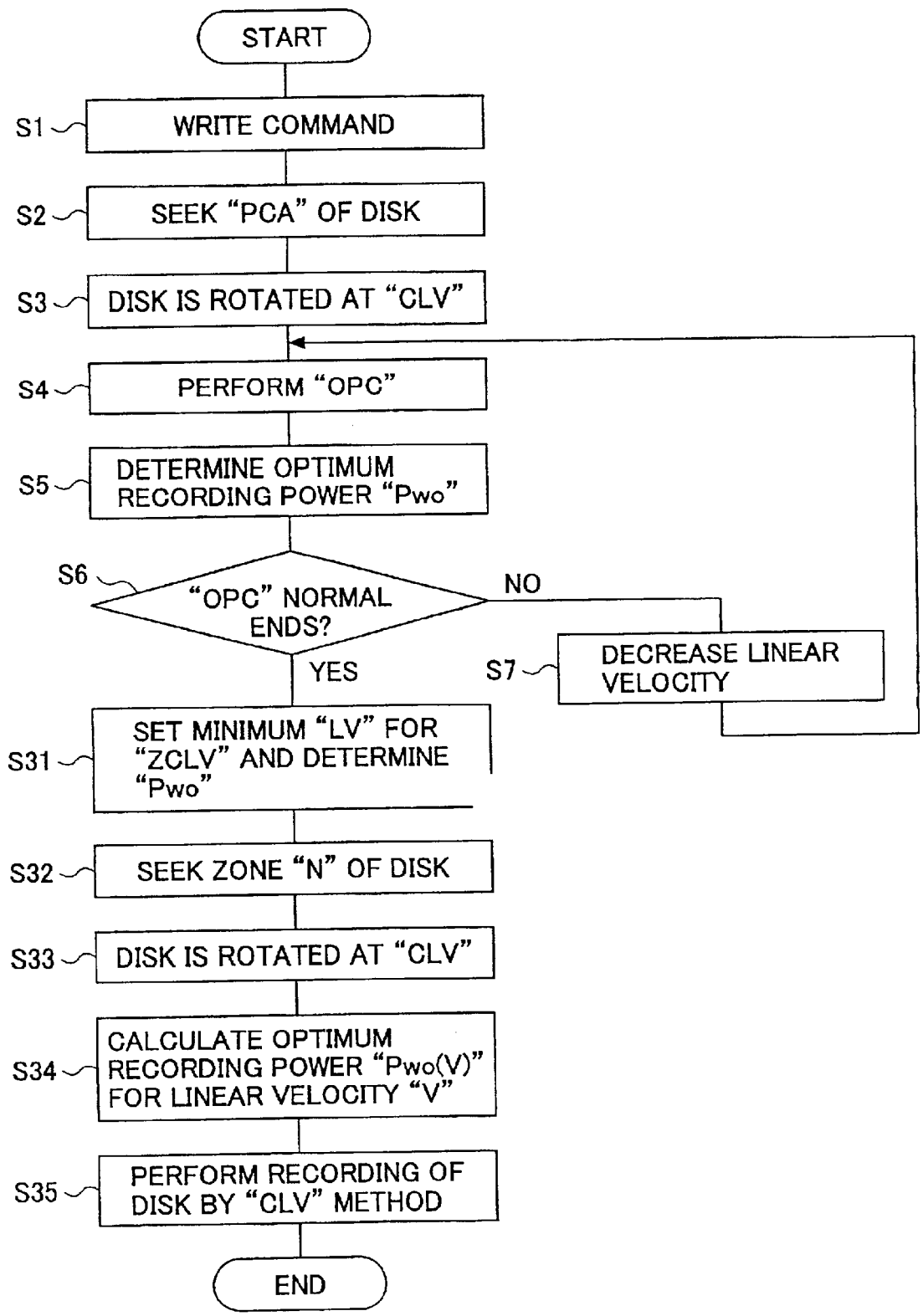
FIG. 8 is a flowchart for explaining another preferred embodiment of the optical recording control method of the present invention.

Next, FIG. 8 shows another preferred embodiment of the optical recording control method of the invention. In FIG. 8, the steps that are essentially the same as corresponding steps in FIG. 3 are designated by the same reference numerals, and a description thereof will be omitted.

In the present embodiment, the optical recording control is basically the same as that of the previous embodiment in FIG. 3 but the recording of the optical disk is carried out by using the ZCLV method instead of the CAV method. In the case of the ZCLV method, the information area of the optical disk is divided in the disk radial direction into a number of zones (for example, four zones). Different linear velocities are allocated to the respective zones of the disk. For example, the 8-fold, 12-fold, 16-fold and 20-fold double speeds are allocated to the four zones of the disk, in this order, in the inner-to-outer direction of the disk. When the recording of one of the zones is performed, the disk is rotated at a constant linear velocity based on the linear velocity allocated to the one of the zones.

As shown in FIG. 8, in the present embodiment, the CPU 17 performs the steps S1 through S7 that are essentially the same as the corresponding steps in FIG. 3. When the result at the step S6 is affirmative, the CPU 17 sets the controlled velocity of the spindle motor 2 during the recording of the disk 1 to a minimum linear velocity, provided for the ZCLV method, which corresponds to the maximum linear velocity at which the OPC operation is normally performed (S31). In the step S31, the CPU 17 determines the optimum recording power "Pwo" that is fixed.

After the step S31 is performed, the CPU 17 controls the pickup 5 so that the pickup 5 seeks a target zone "N" of the disk 1 being recorded (S32). The CPU 17 controls the spindle motor 2 so that the disk 1 is rotated at a constant linear velocity that is determined based on the minimum linear velocity obtained at the step S31 (S33).

After the step S33 is performed, the CPU 17 calculates a second optimum recording power "Pwo (V)" for the linear velocity "V" corresponding to the target zone of the disk 1 being recorded, based on the fixed optimum recording power (S34). After the step S34 is performed, the CPU 17 performs the recording of the disk 1 by using the CLV method based on the second optimum recording power (S35).

In the optical recording control method of the above-described embodiment, the CPU 17 of the optical disk drive sets an angular velocity of the spindle motor 2 corresponding to the maximum linear velocity at which the OPC operation is normally performed. In the steps S4 through S7, every time the OPC operation is not normally performed, the rotation speed of the spindle motor 2 is decreased to the next highest linear velocity, and the next OPC operation is performed again. If the optical disk 1 should be a poor-quality optical disk, it is possible for the present embodiment to appropriately determine the optimum recording power through the OPC prior to the recording of the optical disk based on the ZCLV method, in order to make the starting of the ZCLV-based recording operation at a high recording speed reliable.

Figure 9:
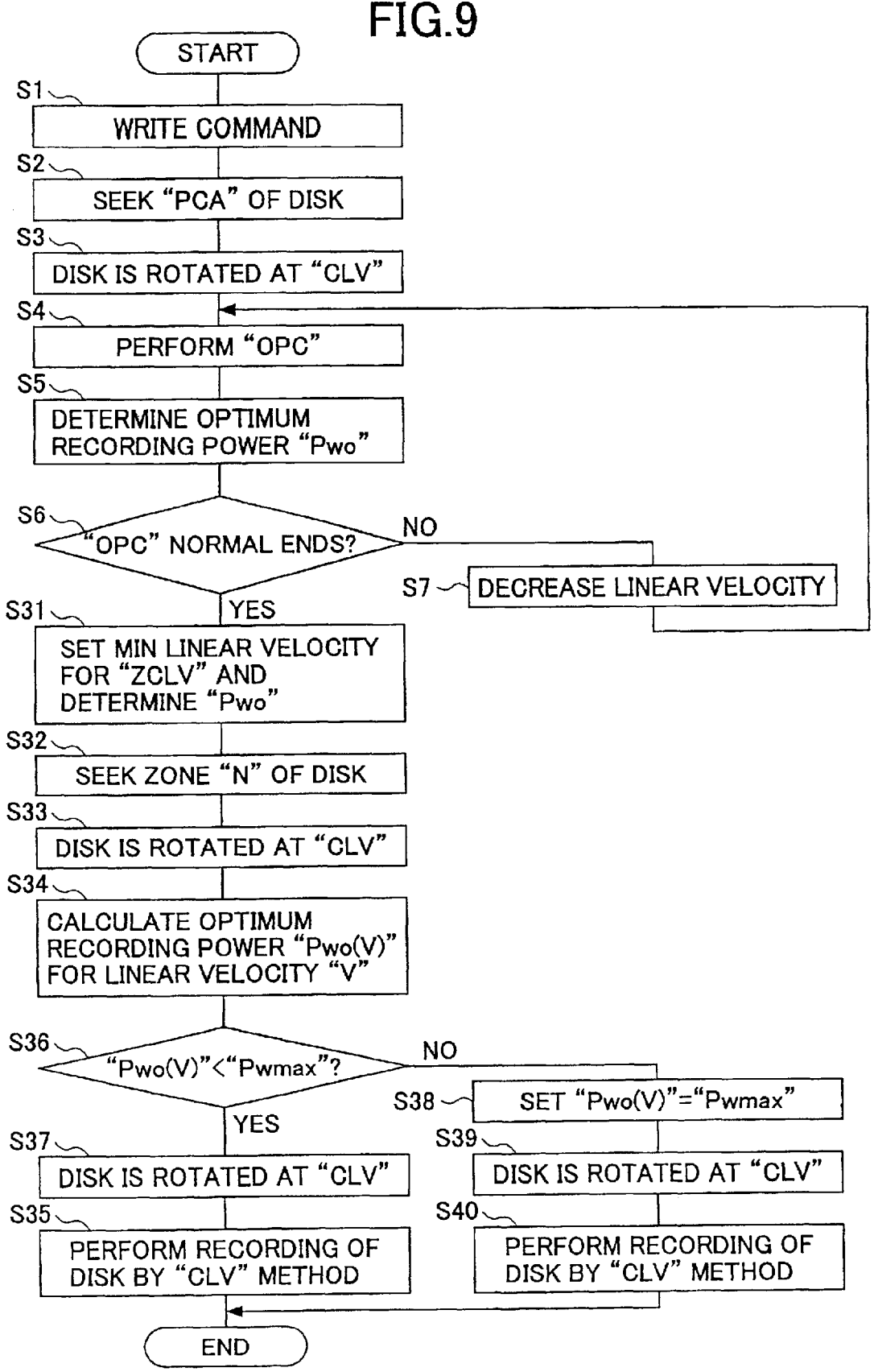
FIG. 9 is a flowchart for explaining another preferred embodiment of the optical recording control method of the present invention.

Next, FIG. 9 shows another preferred embodiment of the optical recording control method of the invention. In FIG. 9, the steps that are essentially the same as corresponding steps in FIG. 8 are designated by the same reference numerals, and a description thereof will be omitted.

In the previous embodiment shown in FIG. 8, the optimum recording power "Pwo (V)" increases in proportion to changes of the linear velocity of the disk 1 when the recording of the disk 1 is performed by using the ZCLV method. Hence, when using the laser diode of the optical pickup with its maximum output power being relatively low, or when using the poor-quality optical disk with a relatively low recording sensitivity, the optimum recording power "Pwo (V)" that is determined through the OPC may exceed the maximum output power "Pwmax" of the laser diode. In such a case, the recording of the disk 1 using the optimum recording power is impossible. The optical recording control method of the present embodiment is provided to eliminate the above problem.

As shown in FIG. 9, in the optical recording control method of the present embodiment, the CPU 17 performs the steps S1 through S34 that are essentially the same as the corresponding steps in FIG. 8. After the step S34 is performed, the CPU 17 determines whether the optimum recording power "Pwo (V)", obtained at the step S34, is smaller than the maximum output power "Pwmax" of the laser diode of the pickup 5 (S36).

When the result at the step S36 is affirmative (Pwo(V)<Pwmax), it is not necessary to change the ZCLV-based recording operation. The CPU 17 controls the spindle motor 2 so that the disk 1 is rotated at a constant linear velocity (S37). The linear velocity used in the step S37 for the ZCLV method is the linear velocity at the target zone to be written by the pickup 5. After the step S37 is performed, the CPU 17 performs the recording of the disk 1 by using the CLV method (S35).

On the other hand, when the result at the step S36 is negative (Pwo(V)≧Pwmax), the ZCLV-based recording operation must be changed. The CPU 17 sets the optimum recording power "Pwo (V)" as being equal to the maximum output power "Pwmax" of the laser diode (S38). After the step S38 is performed, the CPU 17 changes the ZCLV-based recording operation to the CLV-based recording operation. Namely, the CPU 17 controls the spindle motor 2 so that the disk 1 is rotated at a constant linear velocity (S39). The linear velocity used in the step S39 for the CLV method is the linear velocity at the target track to be written by the pickup 5. After the step S39 is performed, the CPU 17 performs the recording of the disk 1 by using the CLV method (S40).

According to the optical recording control method of the above-described embodiment, when using the laser diode of the optical pickup with its maximum output power being relatively low, or when using the poor-quality optical disk with a relatively low recording sensitivity, the optimum recording power "Pwo (V)" that is determined as the result of the steps S36 and S38 does not exceed the maximum output power "Pwmax" of the laser diode. Therefore, it is possible for the present embodiment to eliminate the above problem.

Figure 10:
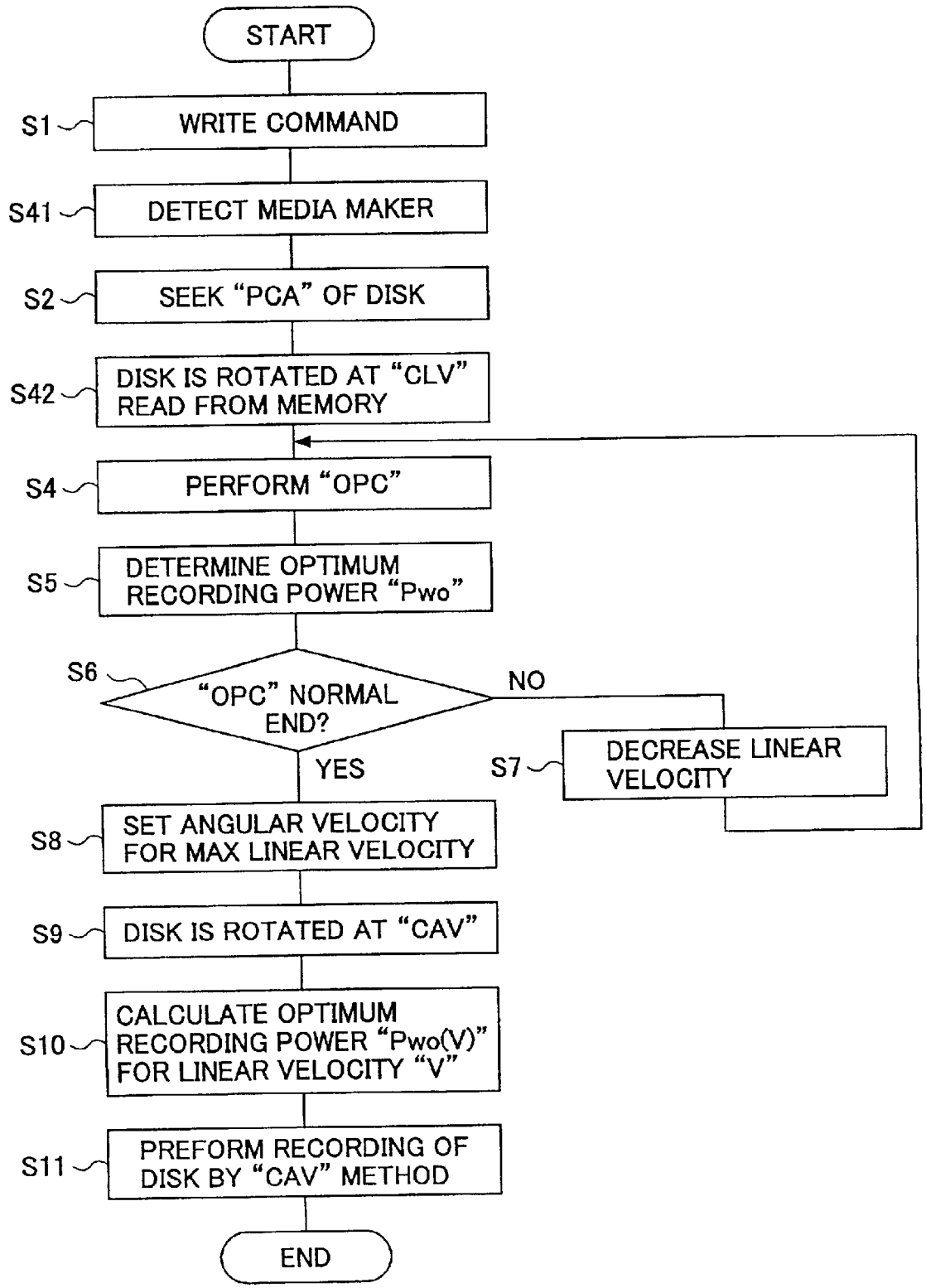
FIG. 10 is a flowchart for explaining another preferred embodiment of the optical recording control method of the present invention.

Next, FIG. 10 shows another preferred embodiment of the optical recording control method of the invention. In FIG. 10, the steps that are essentially the same as corresponding steps in FIG. 3 are designated by the same reference numerals, and a description thereof will be omitted.

In the present embodiment, a media maker of the optical disk 1 is considered in performing the optical recording control according to the present invention. Suppose that the optical disk drive of the present invention is configured such that respective OPC linear velocities corresponding to specific media makers are stored into the ROM 18 or the NVM 21 or another memory of the optical disk drive.

As shown in FIG. 10, in the present embodiment, after the step S1 is performed, the CPU 17 detecting a maker of the disk 1 from a pre-recorded manufacturer code (maker identifier) of the disk 1 (S41). In the case of the CD-R, the lead-in-start-time recorded in the ATIP of the optical disk 1 differs as per the maker of the disk. In this case, the detection of the maker can be achieved by reading out the lead-in-start-time of the disk 1.

After the step S41 is performed, the CPU 17 causes the pickup 5 to seek the PCA 31 of the disk 1 (S2). After the step S2 is performed, the CPU 17 sets the controlled velocity of the spindle motor 2 for the subsequent OPC operation to a corresponding one of the stored OPC linear velocities for the detected maker (S42). In the present embodiment, each of the stored OPC linear velocities corresponding to the specific media makers is provided such that the OPC and the optimum recording power determination are always normally performed at the step S6. Hence, it is possible for the optical recording control method of the present embodiment to reduce the time needed to complete the OPC operation to a shorter time.

In the above-described embodiment, if the media maker is the same but the type of the optical disk 1 is different, the corresponding OPC linear velocity that is suitable to allow the OPC operation to be normally performed becomes different. To avoid the problem, the respective OPC linear velocities corresponding to specific optical disk types, in addition to those corresponding to the media makers, are stored into the memory (the ROM 18 or the NVM 21) of the optical disk drive and the step S41 of the flowchart of FIG. 10 is altered to detect a type f the disk 1 in addition to the maker of the disk 1. In the case of the CD-R, the first digit of the lead-in-start-time recorded in the ATIP of the optical disk 1 contains a type code indicating the type of the disk. For example, when the type code is set to 0 to 4, the disk is of cyanine type, and when the type code is set to 5 to 0, the disk is of phthalocyanine type. In this case, the detection of the maker and type of the disk can be achieved by reading out the lead-in-start-time of the disk 1.

Moreover, in the above-described embodiment, if the media maker is the same but the storage capacity of the optical disk 1 is different (for example, 74-minute CD-R, 80-minute CD-R), the corresponding OPC linear velocity that is suitable to allow the OPC operation to be normally performed becomes different. To avoid the problem, the respective OPC linear velocities corresponding to specific optical disk storage capacities, in addition to those corresponding to the media makers, are stored into the memory (the ROM 18 or the NVM 21) of the optical disk drive and the step S41 of the flowchart of FIG. 10 is altered to detect a storage capacity of the disk 1 in addition to the maker of the disk 1. In this case, the detection of the maker and storage capacity of the disk can also be achieved by reading out the lead-in-start-time of the disk 1.

Figure 11:
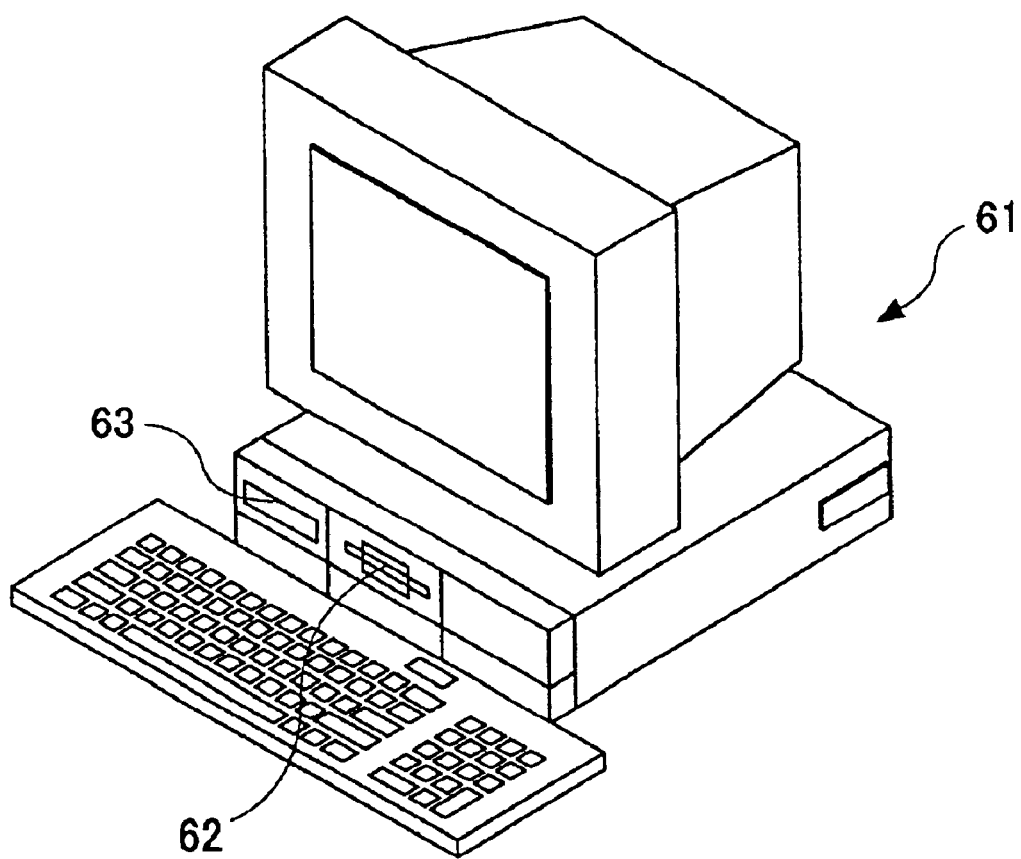
FIG. 11 is a diagram of a data processing apparatus in which the optical disk drive of the invention is provided.

FIG. 11 shows a data processing apparatus in which one embodiment of the optical disk drive of the invention is provided.

As shown in FIG. 11, an optical disk drive 63 that is one embodiment of the optical disk drive of the present invention is incorporated into a personal computer 61, and this personal computer 61 is provided as the data processing apparatus according to the present invention.

The personal computer 61 includes a 3.5-inch floppy disk drive 62 and the optical disk drive 63. The optical disk drive 63 is provided as a built-in type (or integral type) CD-R drive of the personal computer 61. The CPU of the personal computer 61 serves as a host device of the optical disk drive 63. The optical disk drive 63 is one embodiment of the optical disk drive of the present invention.

In the above-described embodiment, the optical disk drive 63, including the laser diode drive control, is provided in the data processing apparatus 61, and it is possible for the above-described embodiment to appropriately determine the optimum recording power for the laser diode during the recording operation even when a poor-quality optical disk causing an OPC error is placed into the optical disk drive 63. The optical disk drive 63 of the data processing apparatus 61 is effective in reliably performing the optical recording control based on the CAV method or the ZCLV method with the optical disk even when it is the poor-quality optical disk 1.

In the above-described embodiment, the optical disk drive 63 is provided as the built-in type CD-R drive of the personal computer 61. Alternatively, the optical disk drive 63 may be formed as a single optical disk device connected to an external host computer via a communication path. Further, the data processing apparatus of the present invention is not limited to the desktop personal computer. Alternatively, the optical disk drive of the present invention may be formed as a built-in type optical disk drive of a notebook type or portable personal computer.

The present invention is not limited to the above-described embodiments, and variations and modifications may be made without departing from the scope of the present invention.

Further, the present invention is based on Japanese priority application No.2000-363939, filed on Nov. 30, 2000, the entire contents of which are hereby incorporated by reference.

What is claimed is:

1. An optical disk drive comprising:
a light source emitting a light beam to a recordable optical disk by a controlled recording power;
a disk rotation device rotating the disk at a controlled velocity;
an OPC unit performing an optical power calibration OPC prior to a start of recording of the disk by accessing a power calibration area at a predetermined track of the disk with the light beam emitted by the light source while the disk is rotated at a constant linear velocity, the OPC being repeated with one of different recording powers being shifted to another and applied to the light source;
an optimum recording power determining unit determining an optimum recording power for the light source during the recording of the disk based on results of the OPC performed by the OPC unit;

an OPC velocity changing unit changing a highest linear velocity of a number of linear velocities, provided for the disk rotation device, to a next highest linear velocity for the controlled velocity of the disk rotation device during a subsequent OPC;

a detecting unit detecting whether the OPC and the optimum recording power determination are normally performed after one of the linear velocities is set by the OPC velocity changing unit; and a rotation speed setting unit setting the controlled velocity of the disk rotation device during the recording to an angular velocity corresponding to said one of the linear velocities at which the OPC and the optimum recording power determination are detected as being normally performed.

2. The optical disk drive of claim 1, wherein the rotation speed setting unit sets an angular velocity of the disk rotation device corresponding to a maximum linear velocity at which the OPC and the optimum recording power determination are detected as being normally performed.

3. The optical disk drive of claim 1, further comprising:

a recording speed control unit controlling the disk rotation device so that the disk is rotated at a constant angular velocity based on the angular velocity set by the rotation speed setting unit;

an emission power computing unit calculating a second optimum recording power for a linear velocity corresponding to a target track of the disk being recorded, based on the optimum recording power determined by the optimum recording power determining unit; and a recording power control unit performing the recording of the disk by using a constant angular velocity method based on the second optimum recording power.

4. The optical disk drive of claim 3, further comprising a determination unit determining whether the second optimum recording power, which is calculated by the emission power computing unit, is smaller than a maximum output power of the light source, wherein, when it is determined that the second optimum recording power is not smaller than the maximum output power, the disk rotation device is controlled so that the disk is rotated at a constant linear velocity based on the linear velocity corresponding to the target track of the disk being recorded.

5. The optical disk drive of claim 1, wherein, when it is determined that the second optimum recording power is not smaller than the maximum output power, the second optimum recording power calculated by the emission power computing unit is set as being equal to the maximum output power of the light source.

6. An optical disk drive in which an information area of a recordable optical disk is divided into a number of zones, and when recording of one of the zones is performed the disk is rotated at a constant linear velocity within the one of the zones, and different linear velocities are allocated to the respective zones of the disk, the optical disk drive comprising:

a light source emitting a light beam to a recordable optical disk by a controlled recording power;

a disk rotation device rotating the disk at a controlled velocity;

an OPC unit performing an optical power calibration OPC prior to a start of recording of the disk by accessing a power calibration area at a predetermined track of the disk with the light beam emitted by the light source while the disk is rotated at a constant linear velocity, the OPC being repeated with one of different recording powers being shifted to another and applied to the light source;

an optimum recording power determining unit determining an optimum recording power for the light source during the recording of the disk based on results of the OPC performed by the OPC unit;

an OPC velocity changing unit changing a highest linear velocity of the linear velocities, provided for the disk rotation device, to a next highest linear velocity for the controlled velocity of the disk rotation device during a subsequent OPC;

a detecting unit detecting whether the OPC and the optimum recording power determination are normally performed after one of the linear velocities is set by the OPC velocity changing unit;

a rotation speed setting unit setting the controlled velocity of the disk rotation device during the recording to a minimum linear velocity, provided for a zone constant linear velocity ZCLV method, at which the OPC and the optimum recording power determination are detected as being normally performed;

a recording speed control unit controlling the disk rotation device so that the disk is rotated at a constant linear velocity based on the minimum linear velocity set by the rotation speed setting unit;

an emission power computing unit calculating a second optimum recording power for a linear velocity corresponding to a target zone of the disk being recorded, based on the optimum recording power determined by the optimum recording power determining unit; and a recording power control unit performing the recording of the disk by using a constant linear velocity CLV method based on the second optimum recording power.

7. The optical disk drive of claim 6, wherein the rotation speed setting unit sets the minimum linear velocity provided for the ZCLV method, based on a maximum linear velocity at which the OPC and the optimum recording power determination are detected as being normally performed.

8. The optical disk drive of claim 6, further comprising a determination unit determining whether the second optimum recording power, which is calculated by the emission power computing unit, is smaller than a maximum output power of the light source, wherein, when it is determined that the second optimum recording power is not smaller than the maximum output power, the disk rotation device is controlled so that the disk is rotated at a constant linear velocity based on the linear velocity corresponding to the target zone of the disk being recorded.

9. The optical disk drive of claim 1, wherein respective OPC linear velocities corresponding to specific media makers are stored into a memory of the disk drive, the optical disk drive further comprising a maker detecting unit detecting a maker of the disk from a pre-recorded maker identifier of the disk, wherein the OPC velocity changing unit sets a corresponding one of the stored OPC linear velocities for the detected maker as being the controlled velocity of the disk rotation unit for the subsequent OPC.

10. The optical disk drive of claim 9, wherein the maker detecting unit detects a type of the disk in addition to the maker of the disk, and the respective OPC linear velocities corresponding to specific optical disk types are stored in the memory, and each predetermined OPC linear velocity is provided such that the OPC and the optimum recording power determination are always normally performed.

11. The optical disk drive of claim 9, wherein the maker detecting unit detects a storage capacity of the disk in addition to the maker of the disk, and the respective OPC linear velocities corresponding to specific optical disk storage capacities are stored in the memory, and each predetermined OPC linear velocity is provided such that the OPC and the optimum recording power determination are always normally performed.

12. An optical recording control method which controls an optical disk drive, the optical disk drive including a light source emitting a light beam to a recordable optical disk by a controlled recording power, and a disk rotation device rotating the disk at a controlled velocity, the optical recording control method comprising the steps of:

performing an optical power calibration OPC prior to a start of recording of the disk by accessing a power calibration area at a predetermined track of the disk with the light beam emitted by the light source while the disk is rotated at a constant linear velocity, the OPC being repeated with one of different recording powers being shifted to another and applied to the light source;

determining an optimum recording power for the light source during the recording of the disk based on results of the OPC;

changing a highest linear velocity of a number of linear velocities, provided for the disk rotation device, to a next highest linear velocity for the controlled velocity of the disk rotation device during a subsequent OPC;

detecting whether the OPC and the optimum recording power determination are normally performed after one of the linear velocities is set in the OPC velocity changing step; and setting the controlled velocity of the disk rotation device during the recording to an angular velocity corresponding to said one of the linear velocities at which the OPC and the optimum recording power determination are detected as being normally performed.

13. The optical recording control method of claim 12, wherein the angular velocity, set by the rotation speed setting step, corresponds to a maximum linear velocity at which the OPC and the optimum recording power determination are detected as being normally performed.

14. The optical recording control method of claim 12, further comprising the steps of:

controlling the disk rotation device so that the disk is rotated at a constant angular velocity based on the angular velocity set by the rotation speed setting step;

calculating a second optimum recording power for a linear velocity corresponding to a target track of the disk being recorded, based on the optimum recording power determined by the optimum recording power determining step; and a recording power control unit performing the recording of the disk by using a constant angular velocity method based on the second optimum recording power.

15. The optical recording control method of claim 14, further comprising the step of determining whether the second optimum recording power, which is calculated by the emission power computing unit, is smaller than a maximum output power of the light source, wherein, when it is determined that the second optimum recording power is not smaller than the maximum output power, the disk rotation device is controlled so that the disk is rotated at a constant linear velocity based on the linear velocity corresponding to the target track of the disk being recorded.

16. The optical recording control method of claim 15, wherein, when it is determined that the second optimum recording power is not smaller than the maximum output power, the second optimum recording power calculated by the emission power computing step is set as being equal to the maximum output power of the light source.

17. An optical recording control method which controls an optical disk drive, the optical disk drive including a light source emitting a light beam to a recordable optical disk by a controlled recording power, and a disk rotation device rotating the disk at a controlled velocity, wherein an information area of a recordable optical disk is divided into a number of zones, and when recording of one of the zones is performed the disk is rotated at a constant linear velocity within the one of the zones, and different linear velocities are allocated to the respective zones of the disk, the optical recording control method comprising the steps of:

performing an optical power calibration OPC prior to a start of recording of the disk by accessing a power calibration area at a predetermined track of the disk with the light beam emitted by the light source while the disk is rotated at a constant linear velocity, the OPC being repeated with one of different recording powers being shifted to another and applied to the light source;

determining an optimum recording power for the light source during the recording of the disk based on results of the OPC performed by the OPC unit;

changing a highest linear velocity of the linear velocities, provided for the disk rotation device, to a next highest linear velocity for the controlled velocity of the disk rotation device during a subsequent OPC;

detecting whether the OPC and the optimum recording power determination are normally performed after one of the linear velocities is set by the changing step;

setting the controlled velocity of the disk rotation device during the recording to a minimum linear velocity, provided for a zone constant linear velocity ZCLV method, at which the OPC and the optimum recording power determination are detected as being normally performed;

controlling the disk rotation device so that the disk is rotated at a constant linear velocity based on the minimum linear velocity set by the rotation speed setting step;

calculating a second optimum recording power for a linear velocity corresponding to a target zone of the disk being recorded, based on the optimum recording power determined by the determining step; and performing the recording of the disk by using a constant linear velocity CLV method based on the second optimum recording power.

18. The optical recording control method of claim 17, wherein in the setting step, the minimum linear velocity provided for the ZCLV method is set based on a maximum linear velocity at which the OPC and the optimum recording power determination are detected as being normally performed.

19. The optical recording control method of claim 17, further comprising the step of determining whether the second optimum recording power, obtained by the calculating step, is smaller than a maximum output power of the light source, wherein, when it is determined that the second optimum recording power is not smaller than the maximum output power, the disk rotation device is controlled so that the disk is rotated at a constant linear velocity based on the linear velocity corresponding to the target zone of the disk being recorded.

20. The optical recording control method of claim 12, wherein respective OPC linear velocities corresponding to specific media makers are stored into a memory of the disk drive, the optical recording control method further comprising the step of detecting a maker of the disk from a pre-recorded maker identifier of the disk, and, in the changing step, the controlled velocity of the disk rotation unit for the subsequent OPC is set to a corresponding one of the stored OPC linear velocities for the detected maker.

21. The optical recording control method of claim 20, wherein the maker detecting step detects a type of the disk in addition to the maker of the disk, and the respective OPC linear velocities corresponding to specific optical disk types are stored in the memory, and each predetermined OPC linear velocity is provided such that the OPC and the optimum recording power determination are always normally performed.

22. The optical recording control method of claim 20, wherein the maker detecting step detects a storage capacity of the disk in addition to the maker of the disk, and the respective OPC linear velocities corresponding to specific optical disk storage capacities are stored in the memory, and each predetermined OPC linear velocity is provided such that the OPC and the optimum recording power determination are always normally performed.

23. A data processing apparatus in which an optical disk drive is provided, the optical disk drive comprising:

a light source emitting a light beam to a recordable optical disk by a controlled recording power;

a disk rotation device rotating the disk at a controlled velocity;

an OPC unit performing an optical power calibration OPC prior to a start of recording of the disk by accessing a power calibration area at a predetermined track of the disk with the light beam emitted by the light source while the disk is rotated at a constant linear velocity, the OPC being repeated with one of different recording powers being shifted to another and applied to the light source;

an optimum recording power determining unit determining an optimum recording power for the light source during the recording of the disk based on results of the OPC performed by the OPC unit;

an OPC velocity changing unit changing a highest linear velocity of a number of linear velocities, provided for the disk rotation device, to a next highest linear velocity for the controlled velocity of the disk rotation device during a subsequent OPC;

a detecting unit detecting whether the OPC and the optimum recording power determination are normally performed after one of the linear velocities is set by the OPC velocity changing unit; and a rotation speed setting unit setting the controlled velocity of the disk rotation device during the recording to an angular velocity corresponding to said one of the linear velocities at which the OPC and the optimum recording power determination are detected as being normally performed.

* * * * *

UNITED STATES PATENT AND TRADEMARK OFFICE
CERTIFICATE OF CORRECTION

PATENT NO. : 6,891,786 B2
DATED : May 10, 2005
INVENTOR(S) : Shinichi Sato

It is certified that error appears in the above-identified patent and that said Letters Patent is hereby corrected as shown below:

<u>Title page,</u>
Insert Item -- [30], Foreign Application Priority Data,
          Nov. 30, 2000     (JP)     2000-363939 --.

<u>Column 5,</u>
Line 4, "a. flowchart" should read -- a flowchart --;

<u>Column 7,</u>
Line 25, "β," should read -- β --;

<u>Column 9,</u>
Line 47, "(S1)." should read -- (S11). --;

<u>Column 10,</u>
Line 55, "(3)." should read -- (3) --; and

<u>Column 13,</u>
Line 48, "type f the" should read -- type of the --.

Signed and Sealed this

Twenty-first Day of March, 2006

JON W. DUDAS
*Director of the United States Patent and Trademark Office*